United States Patent
Ashmawi et al.

(10) Patent No.: US 9,719,536 B2
(45) Date of Patent: Aug. 1, 2017

(54) ASSEMBLIES INCLUDING SHAPE MEMORY ALLOY FITTINGS AND COMPOSITE STRUCTURAL MEMBERS

(71) Applicant: The Boeing Company, Chicago, IL (US)

(72) Inventors: Waeil M. Ashmawi, Bellevue, WA (US); Jaime C. Garcia, Kent, WA (US); Sahrudine Apdalhaliem, Seattle, WA (US); Jeffery L. Marcoe, Bellevue, WA (US); Moushumi Shome, Kent, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 14/323,529

(22) Filed: Jul. 3, 2014

(65) Prior Publication Data
US 2016/0003280 A1    Jan. 7, 2016

(51) Int. Cl.
*F16B 1/00*    (2006.01)

(52) U.S. Cl.
CPC .................................. *F16B 1/0014* (2013.01)

(58) Field of Classification Search
CPC ...... F15B 5/002; F15B 5/0012; F15B 5/0052; Y10T 403/7043; Y10T 403/7094; Y10T 403/61; Y10T 403/65; Y10T 403/655; F16B 1/0014; F16B 2001/0078
See application file for complete search history.

(56) References Cited

U.S. PATENT DOCUMENTS

| | | | | |
|---|---|---|---|---|
| 2,867,460 | A | * | 1/1959 | Johnson .................. F01D 5/026 403/28 |
| 4,832,382 | A | * | 5/1989 | Kapgan ................. F16B 1/0014 174/DIG. 8 |
| 4,859,143 | A | * | 8/1989 | Larrabee .................. F01D 9/04 403/30 |
| 4,880,343 | A | * | 11/1989 | Matsumoto ............. F16B 39/02 411/222 |

(Continued)

OTHER PUBLICATIONS

Rogers, Craig A. , "Intelligent Materials", Scientific America, Sep. 1995, pp. 154-157.

*Primary Examiner* — Joshua J Michener
*Assistant Examiner* — Alp Akbasli
(74) *Attorney, Agent, or Firm* — Kwan & Olynick LLP (57) ABSTRACT

Provided are assemblies having composite structures interlocked with shape memory alloy structures and methods of fabricating such assemblies. Interlocking may involve inserting an interlocking protrusion of a shape memory alloy structure into an interlocking opening of a composite structure and heating at least this protrusion of the shape memory alloy structure to activate the alloy and change the shape of the protrusion. This shape change engages the protrusion in the opening such that the protrusion cannot be removed from the opening. The shape memory alloy structure may be specifically trained prior to forming an assembly using a combination of thermal cycling and deformation to achieve specific pre-activation and post-activation shapes. The pre-activation shape allows inserting the interlocking protrusion into the opening, while the post-activation shape engages the interlocking protrusion within the opening. As such, activation of the shape memory alloy interlocks the two structures.

24 Claims, 7 Drawing Sheets

(56) References Cited

U.S. PATENT DOCUMENTS

| | | | | |
|---|---|---|---|---|
| 4,991,991 | A * | 2/1991 | Ito | C04B 37/005 |
| | | | | 403/272 |
| 5,103,609 | A * | 4/1992 | Thoreson | A62C 2/065 |
| | | | | 52/232 |
| 5,687,995 | A * | 11/1997 | Mori | F16L 13/004 |
| | | | | 156/86 |
| 5,700,337 | A * | 12/1997 | Jacobs | B29C 53/02 |
| | | | | 156/161 |
| 5,881,198 | A * | 3/1999 | Haake | G02B 6/32 |
| | | | | 385/136 |
| 6,029,412 | A * | 2/2000 | Gohlke | F16L 5/04 |
| | | | | 137/75 |
| 6,089,781 | A * | 7/2000 | Kellberg | F16B 1/0014 |
| | | | | 403/297 |
| 6,287,039 | B1 * | 9/2001 | Leconte | B64G 1/641 |
| | | | | 244/158.1 |
| 6,499,700 | B1 * | 12/2002 | Schlosser | B64G 1/402 |
| | | | | 244/158.1 |
| 6,637,110 | B2 * | 10/2003 | Jee | F16L 13/004 |
| | | | | 285/381.1 |
| 6,865,791 | B2 * | 3/2005 | Cook | E04G 23/0218 |
| | | | | 148/402 |
| 8,434,293 | B2 | 5/2013 | Widdle, Jr. et al. | |
| 8,444,682 | B2 | 5/2013 | Yeung et al. | |
| 8,500,392 | B2 * | 8/2013 | Durocher | F01D 9/06 |
| | | | | 415/116 |
| 8,652,606 | B2 * | 2/2014 | Griess | B32B 3/06 |
| | | | | 428/58 |
| 9,200,530 | B2 * | 12/2015 | McCaffrey | F01D 11/16 |
| 2004/0074065 | A1 | 4/2004 | Cheng et al. | |
| 2005/0158573 | A1 * | 7/2005 | Elzey | C22F 1/006 |
| | | | | 428/593 |
| 2005/0172462 | A1 * | 8/2005 | Rudduck | F16B 1/0014 |
| | | | | 24/606 |
| 2006/0002783 | A1 * | 1/2006 | Rudduck | F16B 1/0014 |
| | | | | 411/107 |
| 2006/0110211 | A1 * | 5/2006 | Carman | F16B 11/002 |
| | | | | 403/28 |
| 2008/0181763 | A1 * | 7/2008 | Webster | F01D 21/045 |
| | | | | 415/9 |
| 2008/0256957 | A1 * | 10/2008 | Webster | B64D 29/00 |
| | | | | 60/770 |
| 2008/0314902 | A1 * | 12/2008 | Dayton | F16L 5/04 |
| | | | | 220/235 |
| 2010/0154181 | A1 * | 6/2010 | Flanigan | B29C 39/003 |
| | | | | 24/453 |
| 2010/0301159 | A1 * | 12/2010 | Schnitzer | B64D 1/04 |
| | | | | 244/54 |
| 2011/0194887 | A1 * | 8/2011 | Mankame | F16B 1/0014 |
| | | | | 403/28 |
| 2011/0234362 | A1 * | 9/2011 | Koehler | F03G 7/065 |
| | | | | 337/290 |
| 2011/0300358 | A1 * | 12/2011 | Blohowiak | B32B 5/12 |
| | | | | 428/215 |
| 2012/0211119 | A1 * | 8/2012 | Rule | F16L 21/00 |
| | | | | 138/155 |
| 2013/0009012 | A1 * | 1/2013 | Kobayashi | F16B 1/0014 |
| | | | | 244/173.3 |
| 2013/0043354 | A1 | 2/2013 | Shome et al. | |

\* cited by examiner

ASSEMBLIES INCLUDING SHAPE MEMORY ALLOY FITTINGS AND COMPOSITE STRUCTURAL MEMBERS

TECHNICAL FIELD

This disclosure generally relates to assemblies including shape memory alloy fittings and composite structural members. More specifically, this disclosure relates to assemblies in which shape memory alloy fittings interlock with composite structural members when the shape memory alloys of the fittings are activated by heating and the fittings change their shape.

BACKGROUND

Composite materials are becoming increasing popular for various applications, such as aircraft. A composite is a material that is formed from two or more different components. Characteristics of the composite may be quite different than that of its individual components. The individual components may remain separate and distinct in a structure formed from the composite. Once a composite structure is formed, the structure generally should not be disturbed to maintain integrity of the components forming this structure. This limitation makes it difficult to form structural and other types of connections to composite structures.

SUMMARY

Provided are assemblies having composite structures interlocked with shape memory alloy structures and methods of fabricating such assemblies. Interlocking may involve inserting an interlocking protrusion of a shape memory alloy structure into an interlocking opening of a composite structure and heating at least this protrusion of the shape memory alloy structure to activate the alloy and change the shape of the protrusion. This shape change engages the protrusion in the opening such that the protrusion cannot be removed from the opening. The shape memory alloy structure may be specifically trained prior to forming an assembly using a combination of thermal cycling and deformation to achieve specific pre-activation and post-activation shapes. The pre-activation shape allows inserting the interlocking protrusion into the opening, while the post-activation shape engages the interlocking protrusion and opening. As such, activation of the shape memory alloy interlocks the two structures.

In some embodiments, an assembly comprises a first structure and a second structure. The first structure comprises a composite material and may be referred to as a composite structure or a composite structural member. In some embodiments, the composite material may be any textile composite. The second structure comprises a shape memory alloy and may be referred to as a shape memory alloy structure or a shape memory alloy fitting or simply a fitting. The first structure interlocks with the second structure such that an interlocking protrusion of the second structure extends into an interlocking opening of the first structure. The interlocking protrusion is engaged within the interlocking opening when the first structure is interlocked with the second structure. When engaged, the interlocking protrusion is not movable with respect to the interlocking opening. Furthermore, the interlocking protrusion is configured to change it shape when the interlocking protrusion is heated above the activation temperature of the shape memory alloy used to make the second structure. The activation temperature is sometimes referred to as a transformation temperature as it corresponds to phase transformation of the shape memory alloy as further described below. The shape change engages the interlocking protrusion with the interlocking opening. Specifically, this engagement prevents the interlocking protrusion from moving with respect to the interlocking opening, and the second structure remains attached to the first structure.

In some embodiments, the shape memory alloy is a one-way shape memory alloy. This type of alloy changes the shape of the interlocking protrusion of the second structure during heating but not during the subsequent cooling. More specifically, the interlocking protrusion changes its shape when the interlocking protrusion is heated above the activation temperature. However, the interlocking protrusion does not change its shape again when the interlocking protrusion is subsequently cooled below the activation temperature. In some embodiments, the activation temperature is at least about 350° F. or, more specifically, at least about 400° F. depending on the materials used.

In some embodiments, the assembly also comprises a third structure. The third structure may be also made from the same shape memory alloy that forms the second structure. Alternatively, the third structure may be made from a different shape memory alloy. The first structure interlocks with the third structure such that an interlocking protrusion of the third structure extends into an additional interlocking opening of the first structure. The interlocking protrusion is engaged with the additional interlocking opening when the first structure is interlocked with the third structure. When engaged, the interlocking protrusion is not movable with respect to the additional interlocking opening. The interlocking protrusion is configured to change its shape when the interlocking protrusion is heated above the activation temperature of the shape memory alloy, which may be at least about 350° F. or even at least about 400° F., in some embodiments. Furthermore, the interlocking protrusion is configured to engage with the additional interlocking opening of the first structure thereby preventing the interlocking protrusion of the third structure from moving with respect to the additional interlocking opening of the first structure. In some embodiments, the second structure and the third structure are interlocked with each other in addition to being individually interlocked with the second structure. Furthermore, the second structure and the third structure may form an enclosing sleeve around the first structure.

In some embodiments, the assembly also comprises an adhesive. The adhesive may be disposed between the first structure and the second structure. The adhesive may bond the first structure to the second structure in addition to interlocking the first structure and the second structure.

In some embodiments, the interlocking protrusion of the second structure comprises a first outer protrusion corner and a second outer protrusion corner. The distance between the first outer protrusion corner and the second outer protrusion corner may be configured to increase the when the interlocking protrusion is heated above the activation temperature of the shape memory alloy, which may be at least about 350° F. or even at least about 400° F. in some embodiments. This increase in the distance may be used for interlocking the first and second structures.

In some embodiments, the interlocking opening of the first structure comprises a first outer opening corner and a second outer opening corner. The distance between the first outer opening corner and the second outer opening corner is less than the distance between the first outer protrusion corner and the second outer protrusion corner of the second structure when the first structure interlocked with the second structure. Prior to interlocking, the distance between the first outer opening corner and the second outer opening corner is greater than the distance between the first outer protrusion corner and the second outer protrusion corner.

Provided also is a method of forming an assembly. The method may comprise inserting an interlocking protrusion of a second structure into an interlocking opening of a first structure. The first structure comprises a composite material. The second structure comprises a shape memory alloy. After inserting the interlocking protrusion into the interlocking opening, the method proceeds with heating at least the interlocking protrusion of the second structure. In some embodiments, other portions of the second structure may be heated as well. During heating, the interlocking protrusion of the second structure changes shape and engages the interlocking opening of the first structure such that the interlocking protrusion of the second structure is not movable relative to the interlocking opening of the first structure when the first structure is interlocked with the second structure.

In some embodiments, the method also comprises training the second structure. The training may comprise heating the interlocking protrusion of the second structure. While heated, the shape of the interlocking protrusion of the second structure may be changed. In some embodiments, the training comprises cooling the interlocking protrusion of the second structure and, while cooled, changing the shape of the interlocking protrusion of the second structure.

In some embodiments, the interlocking protrusion of the second structure comprises a first outer protrusion corner and a second outer protrusion corner. The interlocking opening of the first structure comprises a first outer opening corner and a second outer opening corner. Prior to heating, the distance between the first outer protrusion corner and the second outer protrusion corner of the interlocking protrusion of the second structure is less than the distance between the first outer opening corner and the second outer opening corner of the interlocking opening of the first structure. However, after heating, the distance between the first outer protrusion corner and the second outer protrusion corner of the interlocking protrusion of the second structure is greater than the distance between the first outer opening corner and the second outer opening corner of the interlocking opening of the first structure.

In some embodiments, the method also comprises consolidating the composite material of the first structure prior to inserting the interlocking protrusion of the second structure into the interlocking opening of the first structure. The method may also comprise, after consolidating the composite material of the first structure, forming the interlocking opening in the first structure. The method may comprise, prior to heating at least the interlocking protrusion of the second structure, inserting an interlocking protrusion of a third structure into an additional interlocking opening of the second structure. In some embodiments, the interlocking protrusion of the third structure is inserted into the additional interlocking opening of the second structure. In some embodiments, prior to heating at least the interlocking protrusion of the second structure, cooling of at least the interlocking protrusion of the second structure is performed. In some embodiments, the method further comprises disengaging the second structure from the first structure. This operation may be performed after the assembly is removed from the operational environments, e.g., an aircraft placed into repair or maintenance.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Composite materials are being rapidly adopted for various new applications because of their light weight and exceptional structural capabilities. For example, some solid and hollow composite structures have demonstrated high energy absorption characteristics making these structures particular suitable for applications, such as load bearing structure in aircraft and other similar applications. Textile-based materials are examples of composite materials that are considered for various applications requiring high impact, crash, and fatigue resistance. The textile composites, such as near-net shaped components, are often fabricated using braiding techniques. Many unique properties of the textile composites come from the yarn continuity and mechanical interlacing of the yarn within structures formed from these composites. These features prevent crack propagation at the yarn intersection and, as a result, increase the fatigue life. At the same time, the fiber continuity does not limit the application of these composites to axial and bending loads, such as load bearing beams and shafts.

Complex structural geometries and different types of loads often require connecting multiple structures in order to establish load transfer mechanisms. As such, one or more joints along the length of the textile composites are often necessary. Fabrication of each joint delays the manufacturing process and can negatively impact the strength of the primary structure.

Provided are assemblies including composite structures interlocked with shape memory alloy structures. Specifically, each composite structure may be interlocked with one or more shape memory alloy structures. Also provided are methods of forming such assemblies. Some shape memory alloys exhibit unique properties, which are not found in other materials and which are particularly helpful to forming structural connections with composite structures in various assemblies. The properties of particular importance herein are pseudo-elasticity and shape memory effect. Pseudo-elasticity, which is sometimes also referred to as super-elasticity, is an elastic response to an applied stress. Pseudo-elasticity is caused by a phase transformation between the austenitic and martensitic phases of the shape memory alloys. A pseudo-elastic material returns to its previous shape after the removal of even relatively high applied strains. Some examples of suitable shape memory alloys include nickel-titanium alloy, copper-zinc-aluminum alloys, copper-aluminum-nickel alloys and other alloys. Nickel-titanium alloys may be particularly suitable for connecting to composite structures because of the smooth and controlled force exerted upon activation of these alloys, which prevents stress concentration on the surface of the composite structures.

The shape memory alloys display two distinct crystal structures or phases, i.e., a martensite phase and austenite phase. Temperature and internal stresses, which play a part in super-elasticity, determine the current phase of a shape memory alloy. Specifically, the martensite phase exists at lower temperatures, while the austenite phase exists at higher temperatures. The temperature dividing these two phases may be referred to as an activation temperature. When a shape memory alloy is in the martensite phase, the alloys can be easily deformed into any shape. When this shape memory alloy is later heated above its activation temperature, it goes through transformation from the martensite phase into the austenite phase. In the austenite phase, the shape memory alloy returns to its original shape, which is the shape it had before it was deformed. The shape memory alloys may be trained to set their deformation path and joint strength for particular applications, such as interlocking with composite structures without creating stress concentration points often associated with other types of connections, such as fasteners.

A shape memory alloy structure may have a shrink-fit configuration that, when activated, fits around the surface of a composite structure to which the shape memory alloy structure is connected or, more specifically, interlocked. The post-recovery interference of the shape memory alloy structure in this assembly, which may be also referred to as a contact strain, may be between about 0.5% and 3% or, more specifically, between about 1% and 2%, such as about 1.5% based on the pre-activation size of the shape memory alloy structure. Post-recovery interference values below these ranges (e.g., below 1% or, more specifically, below 0.5%) may not provide sufficient interlocking, and the shape memory alloy structure may disengage from the composite structure during operation of the assembly. On the other hand, larger post-recovery interference values (e.g., greater than 2%, or more specifically, greater than 3%) may cause excessive stresses within the assemblies and may compromise the integrity of the composite structures.

Furthermore, shape memory alloy structures may be designed accounting for tolerances of the shape memory alloy structures as well as tolerances of composite structures that the shape memory alloy structures are designed to interlock. The shape memory alloy structures may be also designed to account for various installation clearances. Finally, assemblies including shape memory alloy structures interlocked with composite structures provide sufficient radial flexibility and adequate interfacial bonding strength.

In some embodiments, an assembly may include one or more interlocking mechanisms that engage a composite structure with one or more shape memory alloy structures that form the same assembly. Specifically, an assembly may have three such interlocking mechanisms formed by two shape memory alloy structures and one composite structure. Each shape memory alloy structure may form a separate interlocking mechanism with the composite structure. For example, each shape memory alloy structure may include an interlocking protrusion extending into a corresponding interlocking opening of the composite structure. The interlocking protrusion is engaged and not movable relative the interlocking opening when the composite structure is interlocked with the shape memory alloy structure. The two shape memory alloy structures may be connected during installation and this connection may form a third interlocking mechanism. Each interlocking mechanism may provide some resistance to axial or bending displacements and may be used to transfer some of the loads in these directions.

When multiple interlocking mechanisms are used in the same assembly, each mechanism provides a separate path between the composite structure and one or more shape memory alloy structures. These paths may be viewed as redundant paths. These paths allow the composite structure to continue performing even if the interfacial bond, which may be established by an adhesive, between the composite structure and shape memory alloy structure fails. This redundancy may be used for various critical structural applications, such as aircraft applications.

The shape memory alloy structure may also be used as a loading mechanism without altering the outer and/or inner diameters of a linear composite structure (e.g., hollow tubes) or the inner spatial volume of any composite structured having variable shapes to which this shape memory alloy structure is connected. This feature preserves structural characteristics of the composite structures because, for example, the braiding patterns are retained in textile-type composite structures. Retaining the braiding patterns preserves high processing speeds and maintains structural integrity of the composite structures even though external connections are formed by interlocking shape memory alloy structure to the external surfaces of the composite structures. The proposed assemblies allow forming multiple branching joints on the same continuous composite structure without creating any weakened portions in this composite structure. Furthermore, these assemblies may be formed using non-uniform composite structures, such as structures with variable cross-sections or tapered structures.

The process of forming such assemblies may involve training shape memory alloy structures in order for these structures to keep one shape during installation, which may be referred to as a pre-activation shape, and another shape after installation, which may be referred to as a post-activation shape. Specifically, the pre-activation shape allows inserting an interlocking protrusion of the shape memory allow structure into an interlocking opening of the composite structure. In the pre-activation shape, the distance between the outer protrusion corners of the interlocking protrusion of the second structure is less than the distance between the outer opening corners of the interlocking opening thereby allowing the interlocking protrusion to be inserted into the interlocking opening. The post-activation shape engages the interlocking protrusion and interlocking opening. In the post-activation shape, the distance between the outer protrusion corners of the interlocking protrusion of the second structure is greater than the distance between the outer opening corners of the interlocking opening. This change in shape allows interlocking the shape memory alloy structure with the composite structure.

Due to geometric complexities, the change in shape may be localized to the interlocking protrusion or one or more portions thereof. Specifically, the interlocking protrusion may be cooled prior to inserting it into the interlocking opening and then allowed to heat up, e.g., to the room temperature or some other temperature. Various localized cooling techniques, such as partial immersion into a cooling liquid (e.g., liquid nitrogen), thermo-electric cooling, refrigeration cooling, etc. may be used. Once the shape memory alloy structure is in place, the temperature of the cooled portion may increase due to the heat transfer from the environment and/or from the heating source. The heating may cause expansion of the portion of the shape memory alloy structure protruding into the composite structure thereby forming an interlocking mechanism.

Assembly Examples

Figure 1A:
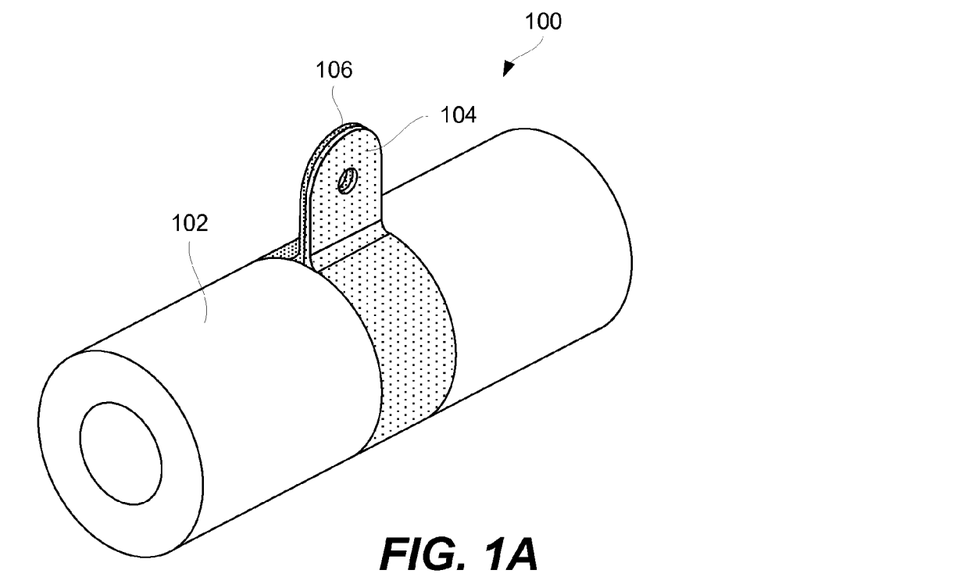
FIGS. 1A and 1B are schematic perspective and sectional views of an assembly including a composite structure interlocked with two shape memory alloy structures, according to one aspect of the present disclosure.

FIG. 1A is a perspective schematic view of assembly 100 including first structure 102 comprising a composite material and a second structure 104 comprising a shape memory alloy, in accordance with some embodiments. First structure 102 may be also referred to as a composite structure, while second structure 104 may be referred to as a shape memory alloy structure or a fitting. FIG. 1A also illustrates optional third structure 106. One having ordinary skill in the art would understand that assembly 100 may include any number of shape memory alloy structures, such as one shape memory alloy structure, two shape memory alloy structures, three shape memory alloy structures, and so on. When multiple shape memory alloy structures are used in the same assembly, these structures may interlock with each other in addition to being individually interlocked with a composite structure. Furthermore, multiple shape memory alloy structures may form an enclosing sleeve around the composite structure.

Figure 1B:
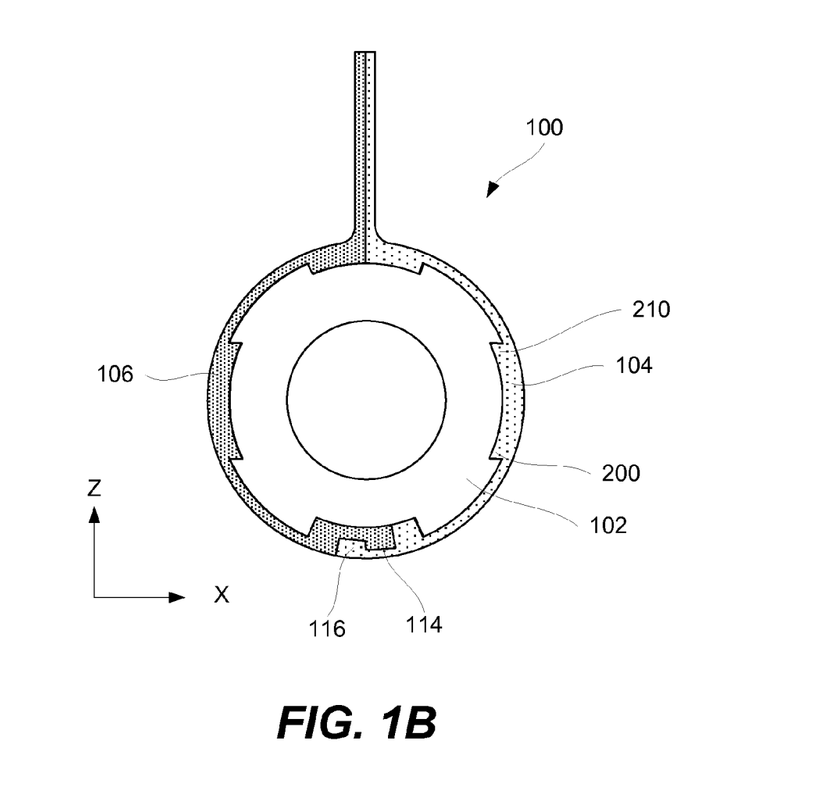

As shown in FIG. 1B and further described below with reference to FIGS. 3 and 4A-4C, first structure 102 interlocks with second structure 104 such that interlocking protrusion 210 of second structure 104 extends into an interlocking opening 200 of first structure 102. Interlocking protrusion 210 is engaged with interlocking opening 200 when first structure 102 is interlocked with second structure 104. In this engaged state, interlocking protrusion 210 is not able to move with respect to interlocking opening 200. Interlocking protrusion 210 is configured to change its shape when interlocking protrusion 210 is heated above the activation temperature of the shape memory alloy, which may be at least about 350° F. or even at least about 400° F. in some embodiments. When the shape is changed during installation, interlocking protrusion 210 engages interlocking opening 200 as shown in FIG. 1B.

First structure 102 comprises a composite material. The composite materials may include polyaryls, such as polyetheretherketone (PEEK), polyetherketoneketone (PEKK), and polyphenylenesulphide (PPS), as well as other thermoplastics. In some embodiments, the composite material of the first structure is braided. Braided composite materials include a fabric constructed by the intertwining of two or more yarn systems to form an integral structure. Braided composites have superior toughness and fatigue strength in comparison, for example, to filament wound composites. Specifically, woven fabrics have orthogonal interlacement, while the braids can be constructed over a wide range of angles. Braids can be produced either as seamless tubes or flat fabrics with a continuous selvedge. Braided composites exhibit superior strength and crack resistance in comparison to, for example, broadcloth composites due to fiber continuity in the braided composites.

Second structure 104 comprises a shape memory alloy. Suitable shape memory alloys include, but are not intended to be limited to, nickel titanium based alloys, indium-titanium based alloys, nickel aluminum based alloys, copper based alloys (e.g., copper-zinc alloys, copper-aluminum alloys, copper-gold, and copper-tin alloys), gold cadmium based alloys, iron-platinum based alloys, iron palladium based alloys, silver-cadmium based alloys, indium-cadmium based alloys, manganese-copper based alloys, and the like. The alloys can be binary, ternary, or any higher order so long as the alloy composition exhibits a shape memory effect, e.g., change in shape orientation, changes in flexural modulus properties, damping capacity, and the like. One particular example of a shape memory alloy is a nickel-titanium based alloy, commercially available under the name of NITINOL (Nickel Titanium Naval Ordnance Laboratory). In some embodiments, the shape memory alloy used for second structure 104 is a one-way shape memory alloy. In this case, interlocking protrusion 210 of second structure 104 changes shape when it is heated above the activation temperature of the alloy but does not change the shape when interlocking protrusion 210 is subsequently cooled below the activation temperature. It should be noted that many shape memory alloys used for other applications, such as medical implants, are two-way shape memory alloys. The two-way shape memory alloys exhibit reversible shape change of materials with thermal cycling, in other words, the shape changes during both heating and cooling. In some embodiments, the same material can be used as either one-way shape memory alloy or a two-way shape memory alloy. This characteristic may depend on the training of the structure. Of course, the composition will also affect this characteristic.

In some embodiments, the activation temperature of the shape memory alloy used for second structure 104 is based on the alloy composition. For example, the activation temperature range of Ni—Ti alloy may be between about −50° F. and 500° F. The shape memory alloy may be specifically configured for other activation temperatures as well. For example, the activation temperature may be at least about 350° F. or even at least about 400° F., in some embodiments. In some embodiments, the activation temperature exceeds the maximum operating temperature by, for example, at least about 50° F. or even at least about 100° F. A different activation temperature may be used for another shape memory alloys structure, if this other structure interlocks with the same composite structure. The difference in activation temperatures may be at least about 50° F. or even at least about 100° F.

As shown in FIGS. 1A and 1B, assembly 100 may also include third structure 106. Third structure 106 may also comprise a shape memory alloy. In some embodiments, third structure 106 and second structure 104 may be made from the same material. Third structure 106 (and any other additional shape memory alloy structure that may be used in the same assembly) may interlock with first structure 102 in a manner similar to which second structure 104 interlocks with first structure 102. Specifically, first structure 102 may interlock with third structure 106 such that an interlocking protrusion of third structure 106 extends into an additional interlocking opening of first structure 102. The interlocking protrusion is engaged to the additional interlocking opening when first structure 102 is interlocked with third structure 106. The engagement prevents the interlocking protrusion from moving with respect to the additional interlocking opening. The interlocking protrusion is configured to change its shape when this protrusion is heated above the activation temperature of the shape memory alloy and engage with the additional interlocking opening.

Furthermore, second structure 104 and third structure 106 may interlock with each other as, for example, shown in FIG. 1B. Second structure 104 may include interlocking step 116 that snugly fits into a corresponding interlocking groove of third structure 106. Likewise, third structure 106 may include interlocking step 114 that snugly fits into a corresponding interlocking groove of second structure 104. These combinations of interlocking steps and grooves engage the bottom end of second structure 104 and the bottom end of third structure 106 in the X direction as shown in FIG. 1B. The interlocking steps and grooves may be configured such that the bottom end of second structure 104 can move relative to the bottom end of third structure 106 in the Z direction, for example during installation of second structure 104 and third structure 106 on first structure 102 and, more specifically, while interlocking second structure 104 with third structure 106. In some embodiments, second structure 104 and third structure 106 may be further interlocked such that the bottom ends of these structures cannot move with respect to each other in the Z direction.

In some embodiments, second structure 104 and third structure 106 form an enclosing sleeve around first structure 102 as, for example, shown in FIG. 1B. As described above, bottom ends of second structure 104 and third structure 106 may interlock. The top ends of second structure 104 and third structure 106 may directly interface and compress against each other. As further described below, the top ends of second structure 104 and third structure 106 may be configured as flanges for attaching to each other and, in some embodiments, to other external structures. FIG. 1A illustrates second structure 104 and third structure 106 having openings in these flanges that are aligned coaxially during installation of second structure 104 and third structure 106 on first structure 102.

In some embodiments, assembly 100 may also include an adhesive disposed between first structure 102 and second structure 104. The adhesive may bond these two structures and prevent separation of these structures in addition to various interlocking features described elsewhere.

Figure 2A:
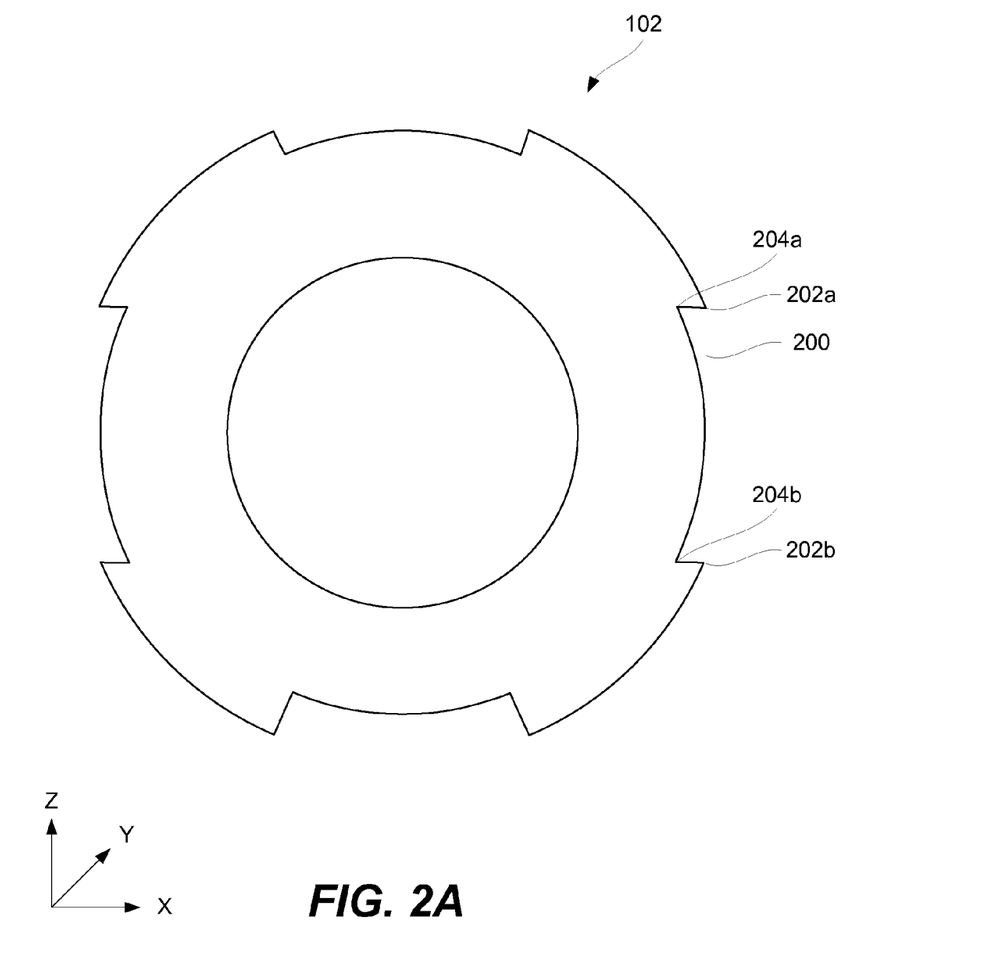
FIG. 2A is a sectional view of the composite structure, which is a part of the assembly shown in FIGS. 1A and 1B, according to one aspect of the present disclosure.

FIG. 2A is a schematic cross-sectional view of first structure 102, in accordance with some embodiments. While first structure 102 is shown to have a substantially round cross-section shape, first structure 102 may have any shape, such as square, rectangular, irregular, etc. It should be noted that at least a portion of the external surface shape of first structure 102 may correspond to the internal surface shape of second structure 104 to ensure adequate surface contact between the two structures. Furthermore, first structure 102 is shown to be hollow, solid composite structures are also within the scope of this disclosure.

First structure 102 includes interlocking opening 200 for interlocking with second structure 104 or some other structure. In some embodiments, first structure 102 includes multiple interlocking openings, such as interlocking opening 200 and interlocking opening 203 as shown in FIG. 2A. Each interlocking opening may be configured to interlock with a different shape memory alloy structure. For example, interlocking opening 200 may be configured to interlock with second structure 104 (shown in FIGS. 1A and 1B), while interlocking opening 203 may be configured to interlock with third structure 106 (shown in FIGS. 1A and 1B). In some embodiments, two or more interlocking openings may be used to interlock with the same shape memory alloy structure. Multiple interlocking openings may have the same configuration or different configurations in order to selectively interlock only with particular other structures. While this disclosure focuses on examples in which a composite structure has one or more interlocking openings and in which a shape memory alloy structure has a corresponding interlocking protrusion, other examples, in which a composite structure has one or more interlocking protrusions and in which a shape memory alloy structure has a corresponding interlocking opening, are also within the scope.

Interlocking opening 200 may include first outer opening corner 202a and second outer opening corner 202b. Interlocking opening 200 may also include first inner opening corner 204a and second inner opening corner 204b. These four corners define the boundary of interlocking opening 200. The distance between first outer opening corner 202a and second outer opening corner 202b may be less than the distance between first inner opening corner 204a and second inner opening corner 204b. This difference in the distances defines the tapered profile of interlocking opening 200 and provides interlocking functionality. Specifically, when a pre-shrunk interlocking protrusion is inserted into interlocking opening 200, the outer protrusion corners of this pre-shrunk interlocking protrusion may be able to pass between first outer opening corner 202a and second outer opening corner 202b. Later, the interlocking protrusion is expanded due to the shape memory alloy effect (and, e.g., heating) and its outer protrusion corners may extend to first inner opening corner 204a and second inner opening corner 204b. In this expanded form, the interlocking protrusion does not engage interlocking opening 200 and pass through the first outer opening corner 202a and second outer opening corner 202b because the distance between first outer opening corner 202a and second outer opening corner 202b is now less than the distance between the outer protrusion corners of the expanded interlocking protrusion. The installation and interlocking operations are further described below with reference to FIGS. 3 and 4A-4C.

The features of interlocking opening 200 may prevent another structure, which is interlocked with first structure 102, from moving relative to first structure 102 in the X direction as shown in FIG. 2A. Furthermore, interlocking opening 200 as well as other interlocking openings may prevent other structures extending into these openings from rotation around the Y axis. Overall, interlocking and other types of engagement between first structure 102 and one or more other structures may provide linear and rotational support along each of the three axes.

Figure 2B:
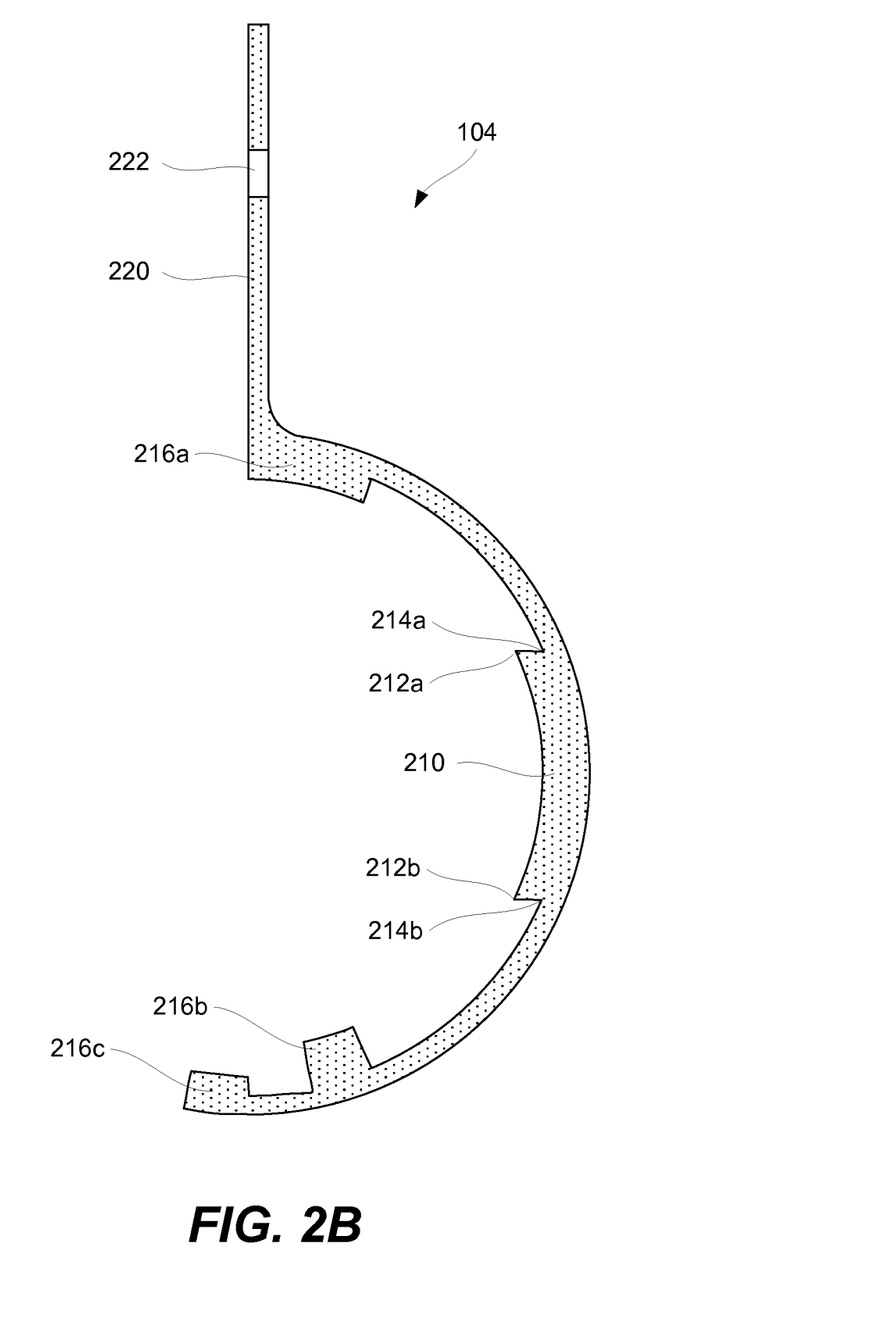
FIG. 2B is a sectional view of the shape memory alloy structure, which is a part of the assembly shown in FIGS. 1A and 1B, according to one aspect of the present disclosure.

FIG. 2B is a schematic cross-sectional view of second structure 104, in accordance with some embodiments. As noted above, second structure 104 is made from a shape memory alloy. The shape memory alloy may be trained to change its shape depending on the temperature of second structure 104. It should be noted that different portions of second structure 104 may respond differently to temperature changes. In some embodiments, outer protrusion corners 212a and 212b can be locally trained.

Second structure 104 includes interlocking protrusion 210, which may be inserted, e.g., into interlocking opening 200 of first structure 102. Interlocking protrusion 210 may include first outer protrusion corner 212a and second outer protrusion corner 212b. Interlocking protrusion 210 may also include first inner protrusion corner 214a and second inner protrusion corner 214b. These four corners define the boundary of interlocking protrusion 210, which in its activated state may be tapered. Furthermore, this activate state boundary of interlocking protrusion 210 may correspond to the boundary of an interlocking opening with which this interlocking protrusion 210 engages. The distance between first outer protrusion corner 212a and second outer protrusion corner 212b of interlocking protrusion 210 may change during installation of second structure 104. For example, prior to installation, the distance between first outer protrusion corner 212a and second outer protrusion corner 212b may be less than the distance between first inner protrusion corner 214a and second inner protrusion corner 214b. Later (i.e., during activation of the shape memory alloy), the shape of interlocking protrusion 210 may change such that the distance between first outer protrusion corner 212a and second outer protrusion corner 212b becomes greater than the distance between first inner protrusion corner 214a and second inner protrusion corner 214b. Specifically, the distance between first outer protrusion corner 212a and second outer protrusion corner 212b is configured to increase when interlocking protrusion 210 of second structure 104 is heated above the activation temperature of the shape memory alloy, which may be at least about 350° F. or even at least about 400° F. This increase in distance may be used for interlocking as described below with reference to FIGS. 3 and 4A-4C.

Second structure 104 may include other protrusions, such as protrusions 216a-216c shown in FIG. 2B. These protrusions may be used to engage first structure 102 and other structures, such as third structure 106 as shown in FIG. 1B. Second structure 104 may also include flange 220 for making mechanical connections to second structure. For example, flange 220 may include opening 222 allowing mechanical fasteners to protrude through flange 220.

Processing Examples

Figure 3:
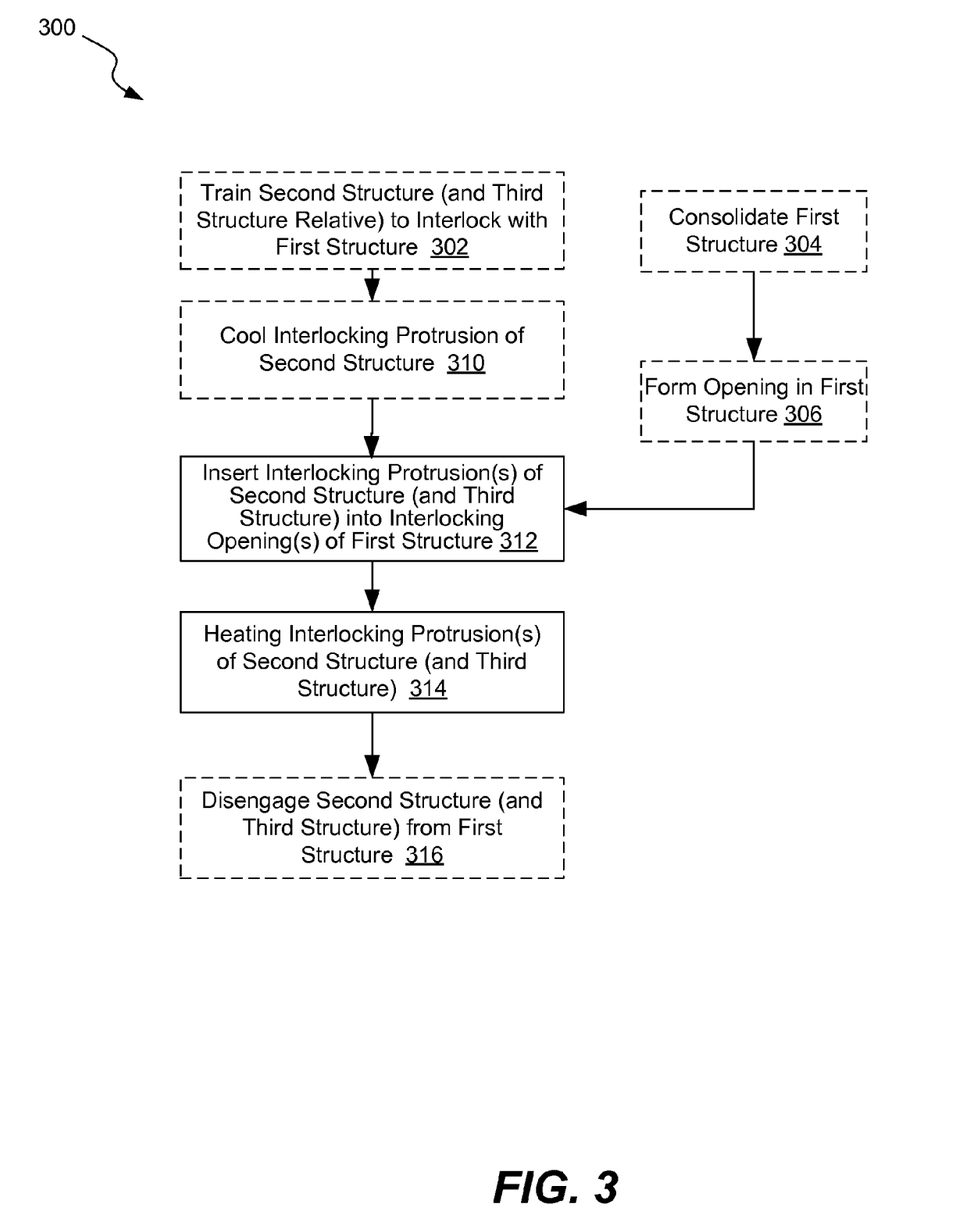
FIG. 3 is a process flowchart corresponding to a method of forming an assembly including a composite structure interlocked with at least one shape memory alloy structure, according to one aspect of the present disclosure.

FIG. 3 is a process flowchart corresponding to a method 300 of forming an assembly of a composite structure and a shape memory alloy structure, in accordance with some embodiments. Various examples of assemblies and its components are described above with reference to FIGS. 1A-1B and 2A-2B. In some examples, an assembly may include multiple shape memory alloy structures, such as two shape memory alloy structures, interlocked with the same composite structure. One or more shape memory alloy structure may form a sleeve around a composite structure. After forming an assembly, the shape memory alloy structure may be connected to one or more external structures and be used for load transfer between these external structures and the composite structure of the assembly. As noted above, in some applications, shape memory alloy structures may be referred to as fittings.

Method 300 may commence with training one or more shape memory alloy structures, such as a second structure comprising a shape memory alloy and, in some examples, an optional third structure comprising the same shape memory alloy or a different shape memory alloy, as shown in operation 302. Training operation 302 may involve heating at least a portion of the second structure that is designed to overlap with a portion of a composite structure, i.e., the first structure in this example. This heated portion of the second structure may be a protrusion. In some embodiments, training operation 302 involves heating the interlocking protrusion and, while heated, changing the shape of the interlocking protrusion. Training operation 302 may also involve cooling interlocking protrusion of the second structure and, while cooled, changing the shape of the interlocking protrusion. A brief description of the training operation will now be provided. A shape memory alloy has two phases, each with a different crystal structure and therefore different properties. One phase is a high temperature phase, which is referred to as an austenite (A) phase. The other phase is a low temperature phase, which is referred to as a martensite (M) phase. The unique property of the shape memory alloy is the result of a martensitic phase transformation that occurs between the high temperature phase (the austenite phase) and the different variants of the low temperature phase (the martensite phase). Under stress-free cooling below the transformation temperature, the austenite phase is converted into a twinned martensite phase. When the twinned martensite phase is subjected to an applied stress that is large enough but lower than the permanent plastic yield stress of the martensite phase, the martensite phase may detwin by reorienting a certain number of variants. The detwinning process results in a macroscopic shape change. The material is then elastically unloaded, and the detwinned martensitic state is retained. Upon heating in the absence of stress, the reverse transformation initiates as the temperature increases where only the parent austenitic phase exists. Since there is no permanent plastic strain generated during detwinning, the original shape of the shape memory alloy is regained.

The range of activation temperatures that correspond to macro-structural changes in depend on the composition. For example, Ni—Ti alloys have activation temperatures of between about −50° F. and +500° F. In addition, this range can be controlled or adjusted if the shape memory alloy is subjected to low or high temperature thermo-mechanical treatment and/or post-deformation annealing.

It should be noted that the composite structure, i.e., the first structure in this example, may have a set shape prior to its interlocking with the shape memory alloy structure during operations 312-316. To form this set shape, method 300 may involve consolidating the first structure during operation 304 and/or forming an opening (e.g., an interlocking opening) in the first structure during operation 306. Consolidation operation 304 may involve subjecting the first operation to a high temperature and/or high pressure to increase density and reduce the volume occupied by voids. In some embodiments, the void content after the consolidation operation is less than 5% by volume or even less than 1% by volume. This set shape may be used to design and train one or more shape memory alloy structures that are later interlocked with the first structure.

In some embodiments, prior to inserting an interlocking protrusion of the second structure into an interlocking opening of the first structure, method 300 involves cooling the interlocking protrusion during operation 310. The cooling process may change the shape of the interlocking protrusion and allow it to be inserted into the interlocking opening. Specifically, the cooling may reduce the distance between the two outer protrusion corners of the interlocking protrusion. Localized cooling may be used such that most of the second structure remains at its initial temperature during and after operation 310. Specifically, the interlocking protrusion of the second structure may be cooled to room temperatures.

Method 300 may proceed with inserting the interlocking protrusion of the second structure into the interlocking opening of the first structure during operation 312. When operation 310 is present, operation 312 may be performed immediately after operation 310 while the interlocking protrusion is still at its low temperature and, therefore, is shrunk. Performing operation 312 at this stage allows the interlocking protrusion to be inserted into the interlocking opening. In some embodiments, operations 310 and 312 may overlap such that cooling is continued while the interlocking protrusion is inserted into the interlocking opening. If another shape memory alloy structure (e.g., the optional third structure) needs to be interlocked with the first structure, then the interlocking protrusion of this other structure may be inserted into an additional interlocking opening of the first structure during operation 312 as well. In this case, two or more shape memory alloy structures may be interlocked (e.g., by heating) with the first structure at the same time. Alternatively, each shape memory alloy structure may be interlocked with the first structure using a separate subset of operations 312 and 314. For example, a second structure may be interlocked with the first structure prior to inserting the interlocking protrusion of the optional third structure into an additional interlocking opening of the first structure.

Figure 4A:
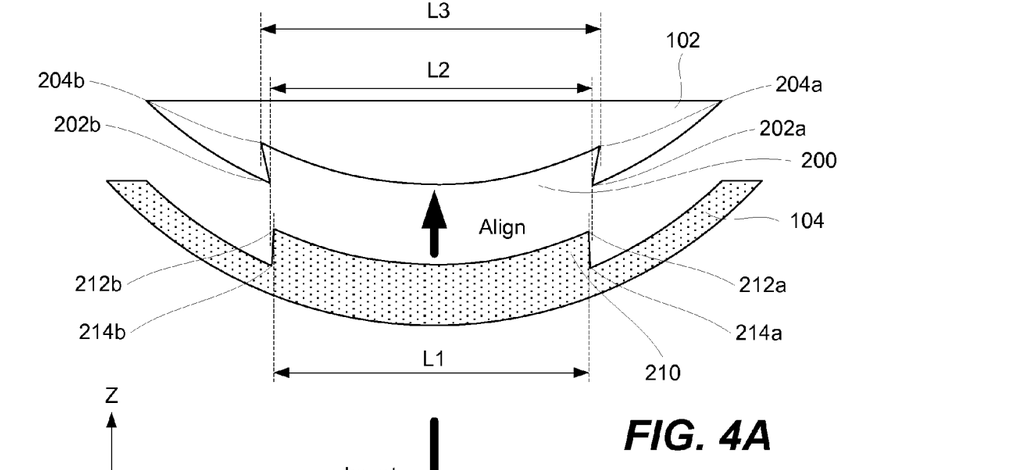
FIGS. 4A-4C are sectional views of the composite structure and shape memory alloy structure during various stages of forming an assembly including these two structures, according to one aspect of the present disclosure.
Figure 4B:
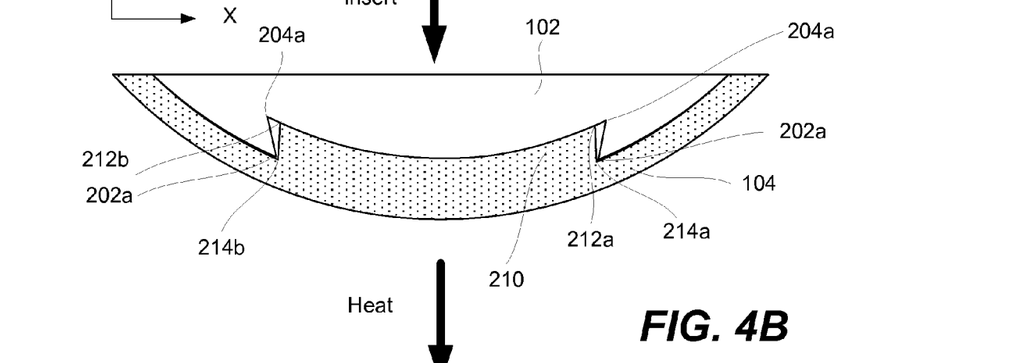

Operation 312 is illustrated in FIGS. 4A and 4B. Specifically, FIG. 4A is a schematic cross-sectional view of first structure 102 and second structure 104 prior to inserting interlocking protrusion 210 into interlocking opening 200. First structure 102 and second structure 104 are already aligned with respect to each other. In this example, the insertion direction corresponds to the Z axis. Prior to and during insertion operation 312, the distance between outer protrusion corners 212a and 212b (shown as L1 in FIG. 4A) is less than the distance between outer opening corners 202a and 202b (shown as L2 in FIG. 4A, with L2>L1). As such, outer opening corners 202a and 202b do not block outer protrusion corners 212a and 212b during insertion of interlocking protrusion 210 into interlocking opening 200. It should be noted that the distance between inner opening corners 204a and 204b (shown as L3 in FIG. 4A) is even greater than the distance between outer opening corners 202a and 202b (i.e., L3>L2). While the shape of interlocking opening 200 remains constant during all interlocking operations (as such, distances L2 and L3 also remain constant), the shape of interlocking protrusion 210 changes during installation. This change of the shape also changes distance L1 as further described below.

FIG. 4B is a schematic cross-sectional view of first structure 102 and second structure 104 after insertion of interlocking protrusion 210 into interlocking opening 200 but prior to heating interlocking protrusion 210, in accordance with some embodiments. The shape of interlocking protrusion 210 is the same as in FIG. 4A and, if needed, interlocking protrusion 210 can still be removed from interlocking opening 200 at this stage. Outer opening corners 202a and 202b may contact inner protrusion corners 214a and 214b. However, inner opening corners 204a and 204b may be separated from outer protrusion corners 212a and 212b at this stage.

Returning to FIG. 3, method 300 may proceed with heating at least the interlocking protrusion of the second structure during operation 314. Specifically, the interlocking protrusion of the second structure may be heated to its activation temperatures, which may be at least about 350° F. or even at least about 400° F. in some embodiments. As described above, the activation temperature depends on the composition of the shape memory alloy. In some embodiments, operation 314 may involve a localized heating of the interlocking protrusion of the second structure such that other portion of the second structure remain unheated to heated below the activation temperature.

Figure 4C:
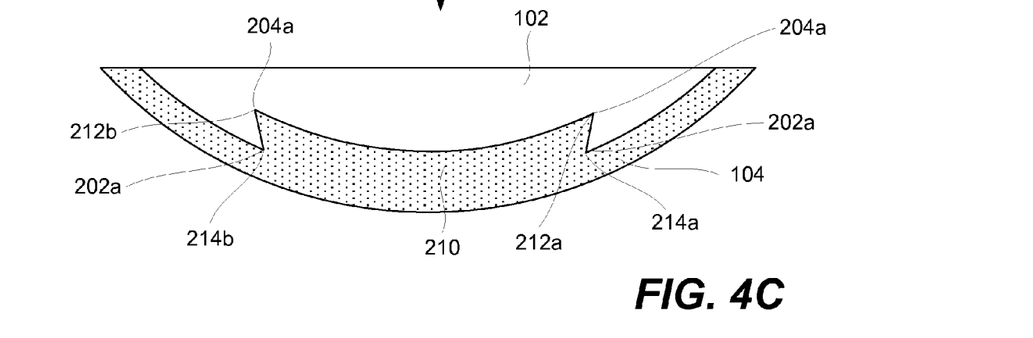

During heating operation 314, the interlocking protrusion of the second structure changes its shape and engages the interlocking opening of the second structure. FIG. 4C is a schematic cross-sectional view of first structure 102 and second structure 104 after these two structures are interlocked. Similar to FIG. 4B, interlocking protrusion 210 is inserted into interlocking opening 200. However, interlocking protrusion 210 shown in FIG. 4C has a different shape than the interlocking protrusion shown in FIG. 4B. Specifically, the distance between outer protrusion corners 212a and 212b has increased during heating of interlocking protrusion 210. As such, interlocking protrusion 210 shown in FIG. 4C cannot move relative interlocking opening 200 at least in one direction, which may be referred to as an engagement direction. This distance may be greater than the distance between outer opening corners 202a and 202b and these corners will retain interlocking protrusion 210 in interlocking opening 200. As shown in FIG. 4C, outer protrusion corners 212a and 212b may engage inner opening corners 204a and 204b In some embodiments, method 300 also involves disengaging the second structure from the first structure during operation 316 for maintainability. This disengagement is generally not performed in an operating environment.

Examples of Aircraft Application

Figure 5:
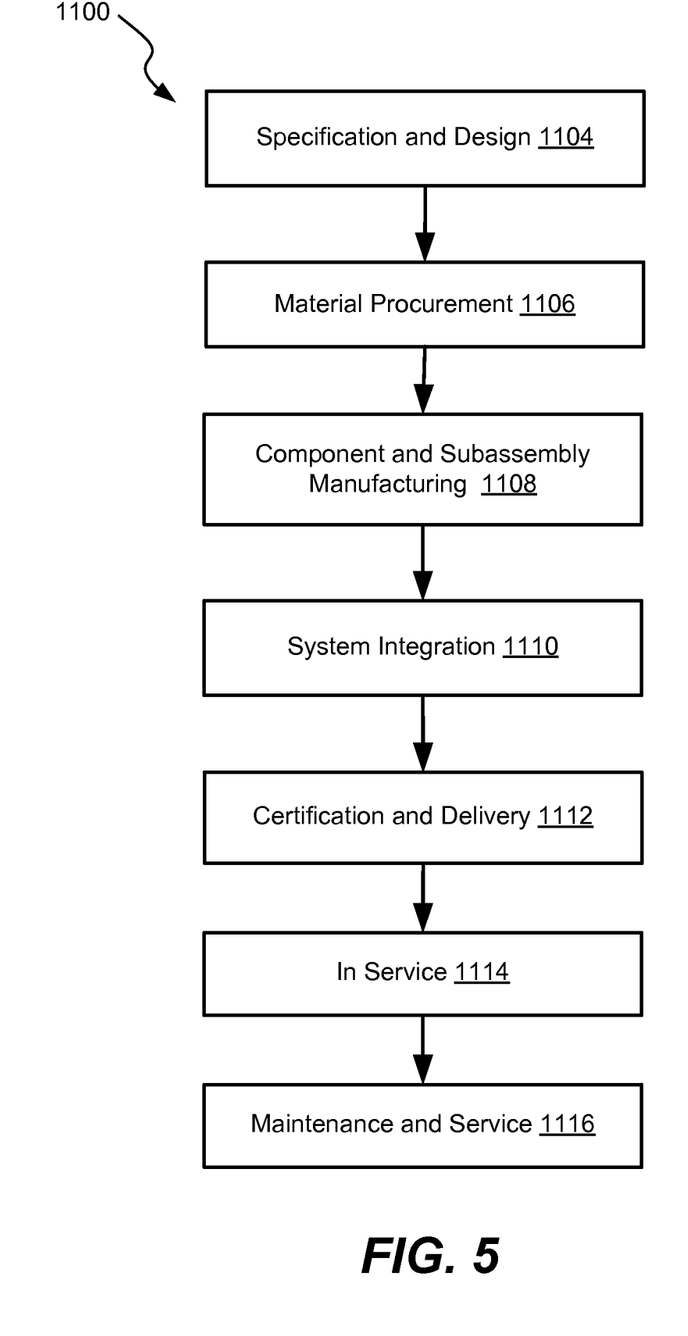
FIG. 5 is a block diagram of an aircraft production and service methodology that may utilize one or more assemblies, each including a composite structure interlocked with at least one shape memory alloy structure.
Figure 6:
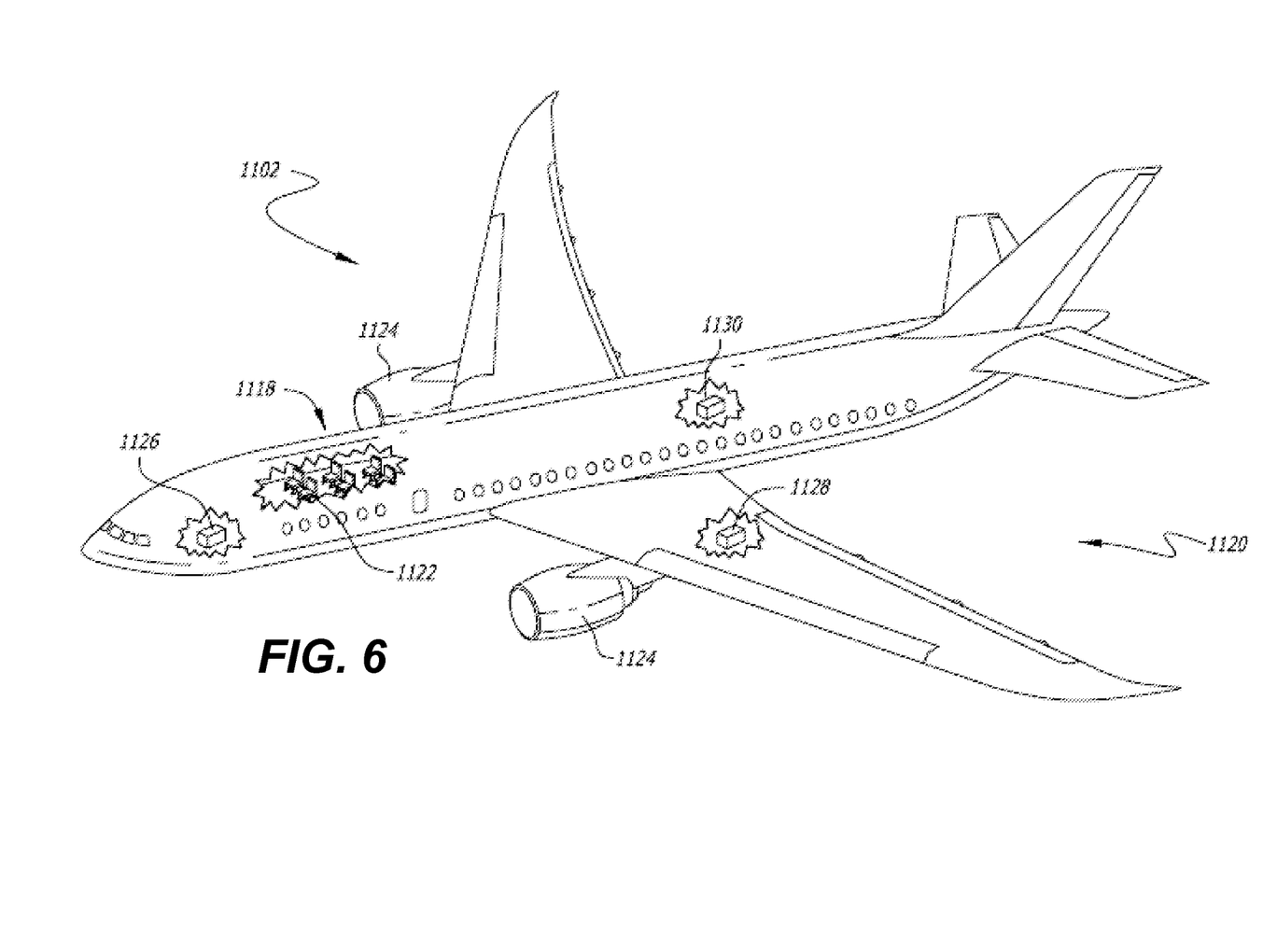
FIG. 6 is a schematic illustration of an aircraft that may utilize one or more assemblies, each including a composite structure interlocked with at least one shape memory alloy structure.

Examples of the disclosure may be described in the context of an aircraft manufacturing and service method 1100 as shown in FIG. 5 and aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of aircraft 1102 take place. Thereafter, aircraft 1102 may go through certification and delivery 1112 to be placed in service 1114. While in service by a customer, aircraft 1102 is scheduled for routine maintenance and service 1116 (which may also include modification, reconfiguration, refurbishment, and so on). Assemblies including composite structures interlocked with shape memory alloys may be used at these various stages, such as material procurement 1106 and component and subassembly manufacturing 1108.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. An assembly comprising:
a first structure formed from a composite material wherein first structure including a first opening that extends through an outer surface of the first structure and into a first cavity in an interior of the first structure wherein the first opening includes a first outer opening edge and a second outer opening edge which are substantially parallel and wherein the first outer opening edge and the second outer opening edge are separated by a first distance;
a sleeve which surrounds the first structure and covers the first opening wherein the sleeve includes a first protrusion having a first outer protrusion edge and a second outer protrusion edge substantially parallel to one another, said first protrusion formed from a shape memory alloy;
wherein the first protrusion is configured to transition from a first shape to a second shape when the shape memory alloy is heated above an activation temperature;
wherein, in the first shape, a second distance, between the first outer protrusion edge and second outer protrusion edge, is less than the first distance to allow the first protrusion to fit through the first opening;
wherein, in the second shape, a third distance, between the first outer protrusion edge and second outer protrusion edge, is greater than the first distance to prevent the first protrusion from fitting through the first opening after it is inserted through the first opening in the first shape.

2. The assembly of claim 1, wherein the first protrusion is heated above the activation temperate after it is inserted through first opening in the first shape to transition the first protrusion to the second shape and lock the first protrusion in place within the first cavity.

3. The assembly of claim 1, wherein the shape memory alloy is a one-way shape memory alloy such that the first protrusion retains the second shape when the shape memory alloy is cooled below the activation temperature.

4. The assembly of claim 1, wherein, in the first shape, a portion of the first protrusion inserted into the first cavity does not conform to sides of the first cavity and wherein, in the second shape, the portion of the first protrusion inserted into the first cavity conforms to the sides of the first cavity.

5. The assembly of claim 1, wherein the first cavity is shaped to provide room for a portion of the first protrusion inserted into the cavity to expand from the first shape to the second shape.

6. The assembly of claim 1, wherein the composite material is braided.

7. The assembly of claim 1, wherein the sleeve comprises a first piece and a second piece wherein the first protrusion is located on the first piece.

8. The assembly of claim 7, wherein a portion of the first piece is configured to interlock with a portion of the second piece.

9. The assembly of claim 7, wherein the first structure includes a second opening that extends through the outer surface of the first structure and into a second cavity and wherein the second piece includes a second protrusion, the second protrusion formed from the shape memory alloy, wherein the second protrusion is configured to transition from the first shape to the second shape when the shape memory allow is heated above the activation temperature and wherein, in the first shape, a portion of the second protrusion is inserted through the second opening and wherein, in the second shape, the portion of second protrusion expands to lock the portion of the second protrusion into place.

10. An assembly comprising:
a first structure comprising a composite material including a first cavity interior to an outer surface of the first structure,
wherein a first opening extends through the outer surface to the first cavity, and wherein a portion of the first cavity extends beyond outer edges of the first opening such that a solid portion of the first structure is located between sides of the first cavity and the outer surface; and
a second structure including a first protrusion, said first protrusion comprising a shape memory alloy wherein the first protrusion is configured to transition from a first shape to a second shape when the shape memory alloy is heated above an activation temperature,
wherein the first protrusion in the first shape is configured to fit through the first opening such that the first protrusion extends into the first cavity and, while in the first cavity, the first protrusion is heated above the activation temperature to transition the first protrusion from the first shape to the second shape;
wherein a portion of the first protrusion in the second shape is configured to extend into the portion of the first cavity that extends beyond the outer edges of the first opening to lock the first protrusion in place within the first cavity and prevent the portion of the first protrusion from being removed from the first cavity;
wherein the first structure further includes a second cavity interior to the outer surface of the first structure, wherein a second opening extends through the outer surface of the first structure to the second cavity, and wherein a portion of the second cavity extends beyond outer edges of the second opening such that a second solid portion of the first structure is located between sides of the second cavity and the outer surface, further comprising a third structure including a second protrusion, said second protrusion, comprising the shape memory alloy wherein the second protrusion is configured to transition from a third shape to a fourth shape when the shape memory alloy is heated above the activation temperature, wherein the second protrusion in the third shape is configured to fit through the second opening such that the second protrusion extends into the second cavity and, while in the second cavity, the second protrusion is heated above the activation temperature to transition the second protrusion from the third shape to the fourth shape;

wherein a portion of the second protrusion in the second shape is configured to extend into the portion of the second cavity that extends beyond the outer edges of the second opening to lock the second protrusion in place within the second cavity and prevent the second portion of the second protrusion from being removed from the second cavity;

wherein the first structure further includes a second cavity interior to the outer surface of the first structure, wherein a second opening extends through the outer surface of the first structure to the second cavity, and wherein a portion of the second cavity extends beyond outer edges of the second opening such that a second solid portion of the firs-t structure is located between sides of the second cavity and the outer surface, further comprising a third structure including a second protrusion, said second protrusion, comprising the shape memory alloy wherein the second protrusion is configured to transition from a third shape to a fourth shape when the shape memory alloy is heated above the activation temperature, wherein the second protrusion in the third shape is configured to fit through the second opening such that the second protrusion extends into the second cavity and, while in the second cavity, the second protrusion is heated above the activation temperature to transition the second protrusion from the third shape to the fourth shape;

wherein a portion of the second protrusion in the second shape is configured to extend into the portion of the second cavity that extends beyond the outer edges of the second opening to lock the second protrusion in place within the second cavity and prevent the second portion of the second protrusion from being removed from the second cavity; and wherein the second structure includes a third protrusion, the third structure includes a fourth protrusion and the first structure includes a third cavity interior to the outer surface wherein a third opening extends through the outer surface of the first structure to the third cavity, wherein the third protrusion and the fourth protrusion are shaped to interlock with each other and wherein a portion of the third protrusion and a portion of the fourth protrusion extend into the third cavity to conform with sides of the third cavity.

11. An assembly comprising:

a first structure comprising a composite material including a first cavity interior to an outer surface of the first structure, wherein a first opening extends through the outer surface to the first cavity, and wherein a portion of the first cavity extends beyond outer edges of the first opening such that a solid portion of the first structure is located between sides of the first cavity and the outer surface; and a second structure including a first protrusion, said first protrusion comprising a shape memory alloy wherein the first protrusion is configured to transition from a first shape to a second shape when the shape memory alloy is heated above an activation temperature, wherein the first protrusion in the first shape is configured to fit through the first opening such that the first protrusion extends into the first cavity and, while in the first cavity, the first protrusion is heated above the activation temperature to transition the first protrusion from the first shape to the second shape;

wherein a portion of the first protrusion in the second shape is configured to extend into the portion of the first cavity that extends beyond the outer edges of the first opening to lock the first protrusion in place within the first cavity and prevent the portion of the first protrusion from being removed from the first cavity;

wherein the first structure further includes a second cavity interior to the outer surface of the first structure, wherein a second opening extends through the outer surface of the first structure to the second cavity, and wherein a portion of the second cavity extends beyond outer edges of the second opening such that a second solid portion of the first structure is located between sides of the second cavity and the outer surface, further comprising a third structure including a second protrusion, said second protrusion, comprising the shape memory alloy wherein the second protrusion is configured to transition from a third shape to a fourth shape when the shape memory alloy is heated above the activation temperature, wherein the second protrusion in the third shape is configured to fit through the second opening such that the second protrusion extends into the second cavity and, while in the second cavity, the second protrusion is heated above the activation temperature to transition the second protrusion from the third shape to the fourth shape;

wherein a portion of the second protrusion in the second shape is configured to extend into the portion of the second cavity that extends beyond the outer edges of the second opening to lock the second protrusion in place within the second cavity and prevent the second portion of the second protrusion from being removed from the second cavity;

wherein the first structure further includes a second cavity interior to the outer surface of the first structure, wherein a second opening extends through the outer surface of the first structure to the second cavity, and wherein a portion of the second cavity extends beyond outer edges of the second opening such that a second solid portion of the first structure is located between sides of the second cavity and the outer surface, further comprising a third structure including a second protrusion, said second protrusion, comprising the shape memory alloy wherein the second protrusion is configured to transition from a third shape to a fourth shape when the shape memory alloy is heated above the activation temperature, wherein the second protrusion in the third shape is configured to fit through the second opening such that the second protrusion extends into the second cavity and, while in the second cavity, the second protrusion is heated above the activation temperature to transition the second protrusion from the third shape to the fourth shape;

wherein a portion of the second protrusion in the second shape is configured to extend into the portion of the second cavity that extends beyond the outer edges of the second opening to lock the second protrusion in place within the second cavity and prevent the second portion of the second protrusion from being removed from the second cavity; and wherein the second structure and the third structure form an enclosing sleeve around the first structure.

12. The assembly of claim 1, wherein the first protrusion is cooled prior to it being inserted the first opening.

13. The assembly of claim 11, wherein the shape memory alloy is selected from the group consisting of nickel-titanium based alloys, indium-titanium based alloys, nickel-aluminum based alloys, copper-zinc alloys, copper-aluminum alloys, copper-gold alloys, copper-tin alloys, gold-cadmium based alloys, iron-platinum based alloys, iron-palladium based alloys, silver-and cadmium based alloys, indium-cadmium based alloys, manganese-copper based alloys.

14. The assembly of claim 1, wherein the shape memory alloy is selected from the group consisting of nickel-titanium based alloys, indium-titanium based alloys, nickel-aluminum based alloys, copper-zinc alloys, copper-aluminum alloys, copper-gold alloys, copper-tin alloys, gold-cadmium based alloys, iron-platinum based alloys, iron-palladium based alloys, silver-and cadmium based alloys, indium-cadmium based alloys, manganese-copper based alloys.

15. The assembly of claim 1, wherein a cross-section of a portion of the first structure is one of substantially round shaped, square shaped or rectangularly shaped.

16. The assembly of claim 1, wherein a cross-section of a portion of the first structure is one of substantially round shaped, square shaped or rectangularly shaped.

17. The assembly of claim 11, wherein the first protrusion is cooled prior to it being inserted the first opening.

18. The assembly of claim 11, wherein the shape memory alloy is a one-way shape memory alloy such that the first protrusion of the second structure retains the second shape when the shape memory alloy is cooled below the activation temperature.

19. The assembly of claim 11, wherein the activation temperature is at least 350° F.

20. The assembly of claim 11, wherein the second structure includes a third protrusion, the third structure includes a fourth protrusion and the first structure includes a third cavity interior to the outer surface wherein a third opening extends through the outer surface of the first structure to the third cavity, wherein the third protrusion and the fourth protrusion are shaped to interlock with each other and wherein a portion of the third protrusion and a portion of the fourth protrusion extend into the third cavity to conform with sides of the third cavity.

21. The assembly of claim 11, wherein the composite material is braided.

22. The assembly of claim 11, further comprising an adhesive disposed between the first structure and the second structure, the adhesive bonding the first structure to the second structure.

23. The assembly of claim 11, wherein the first protrusion of the second structure comprises a first outer protrusion corner and a second outer protrusion corner, and wherein a distance between the first outer protrusion corner and the second outer protrusion corner is configured to increase from a first distance to a second distance when the first protrusion of the second structure is heated above the activation temperature of the shape memory alloy such that the first protrusion transitions from the first shape to the second shape and wherein, in the second shape, the first outer protrusion corner and the second outer protrusion corner each extend into the portion of the first cavity that extends beyond the outer edges of the opening to lock the first protrusion in place within the first cavity.

24. The assembly of claim 23, wherein the first opening of the first structure comprises a first outer opening corner and a second outer opening corner, and where a third distance between the first outer opening corner and the second outer opening corner is greater than the first distance when the first protrusion is in the first shape and wherein third distance is less than the second distance when the first protrusion is in the second shape.

* * * * *